(12) United States Patent
Fukuizumi et al.

(10) Patent No.: US 7,191,701 B2
(45) Date of Patent: Mar. 20, 2007

(54) TRASH COMPACTOR FOR LAVATORY UNIT OF AIRCRAFT

(75) Inventors: Masahito Fukuizumi, Tokyo (JP); Ushio Itakura, Tokyo (JP)

(73) Assignee: Jamco Corporation, Tokyo (JP)

( * ) Notice: Subject to any disclaimer, the term of this patent is extended or adjusted under 35 U.S.C. 154(b) by 0 days.

(21) Appl. No.: 11/002,667

(22) Filed: Dec. 3, 2004

(65) Prior Publication Data
US 2005/0257698 A1    Nov. 24, 2005

(30) Foreign Application Priority Data
May 24, 2004   (JP)   .............................. 2004-152747

(51) Int. Cl.
*B30B 1/04*   (2006.01)
(52) U.S. Cl. .................. 100/229 A; 100/215; 100/233; 100/266; 100/295
(58) Field of Classification Search ................ 100/100, 100/215, 229 A, 233, 266, 295; 53/527; 220/908; 141/73, 80
See application file for complete search history.

(56) References Cited

U.S. PATENT DOCUMENTS

| | | | | |
|---|---|---|---|---|
| 4,519,308 A | * | 5/1985 | Eberle | .................... 100/102 |
| 4,729,303 A | * | 3/1988 | Durbin | ...................... 100/214 |
| 5,588,358 A | | 12/1996 | Klepacki et al. | |
| 5,806,416 A | * | 9/1998 | Cerniglia et al. | .............. 100/90 |
| 5,884,556 A | | 3/1999 | Klepacki et al. | |
| 2004/0163170 A1 | * | 8/2004 | Cooper et al. | ................. 4/664 |

FOREIGN PATENT DOCUMENTS

| | | |
|---|---|---|
| DE | 28 33 632 A1 | 2/1980 |
| DE | 32 45 572 A1 | 6/1984 |
| EP | 0 066 840 A | 12/1982 |
| JP | 7-300203 | 11/1995 |
| JP | 8-2604 | 1/1996 |

* cited by examiner

Primary Examiner—Lowell A. Larson
Assistant Examiner—Jimmy Nguyen
(74) Attorney, Agent, or Firm—Westerman, Hattori, Daniels & Adrian, LLP.

(57) ABSTRACT

A manual trash compactor for a trash bin is disposed inside a lavatory unit of an aircraft. A trash bin disposed within a wash basin in a lavatory unit of an aircraft has a lid through which trash is thrown in disposed on an upper surface of the wash basin. Below the lid is equipped a container for trash. A trash compactor has a trash compressing member pivotably disposed via a shaft 154 on a frame. The trash compressing member is pivoted manually using a handle to compress and reduce the quantity of the trash inside the container.

1 Claim, 5 Drawing Sheets

TRASH COMPACTOR FOR LAVATORY UNIT OF AIRCRAFT

The present application is based on and claims priority of Japanese patent application No. 2004-152747 filed on May 24, 2004, the entire contents of which are hereby incorporated by reference.

BACKGROUND OF THE INVENTION

1. Field of the Invention

The present invention relates to a trash compactor equipped in a lavatory unit mounted on an aircraft.

2. Description of the Related Art

In a lavatory unit of an aircraft, a toilet bowl, a wash basin, a trash bin and the like are equipped.

Since effective space is limited on board an aircraft, there may be cases where it is difficult to secure sufficient capacity for the trash bin and the like.

Moreover, there are certain difficulties related to the process of collecting the trash in the trash bin of an aircraft.

For example, the following patent documents disclose trash (refuse) bins with compressing functions utilizing air bags equipped in the trash bins.

Patent Document 1:
Japanese Patent Laid-Open Publication No. 07-300203

Patent Document 2:
Japanese Patent Laid-Open Publication No. 08-002604

The trash bin equipped in the lavatory unit of an aircraft has small total capacity and must be disposed in a limited installation space.

SUMMARY OF THE INVENTION

The object of the present invention is to provide a trash compactor for a lavatory unit of an aircraft that satisfies the above demands.

The trash compactor according to the present invention is disposed inside a lavatory unit of an aircraft and has a container for storing trash thrown therein through a pivotable lid attached to a trash slot, a trash compressing member having a pair of arms that are pivotably supported via a shaft on a frame in which the container is housed, a plate member attached to an end of the trash compressing member and connecting the pair of arms, and a manipulating handle attached to one of said arms. Further, the trash compressing member is positioned so that a line of pivoting action thereof does not interfere with a line of pivoting action of the lid on the trash slot, and further comprises a spring for biasing the trash compressing member toward a standby position.

According to the present invention, it becomes possible to effectively utilize the trash bin disposed in the lavatory unit of an aircraft, in which space is limited.

DETAILED DESCRIPTION OF THE PREFERRED EMBODIMENTS

Figure 1:
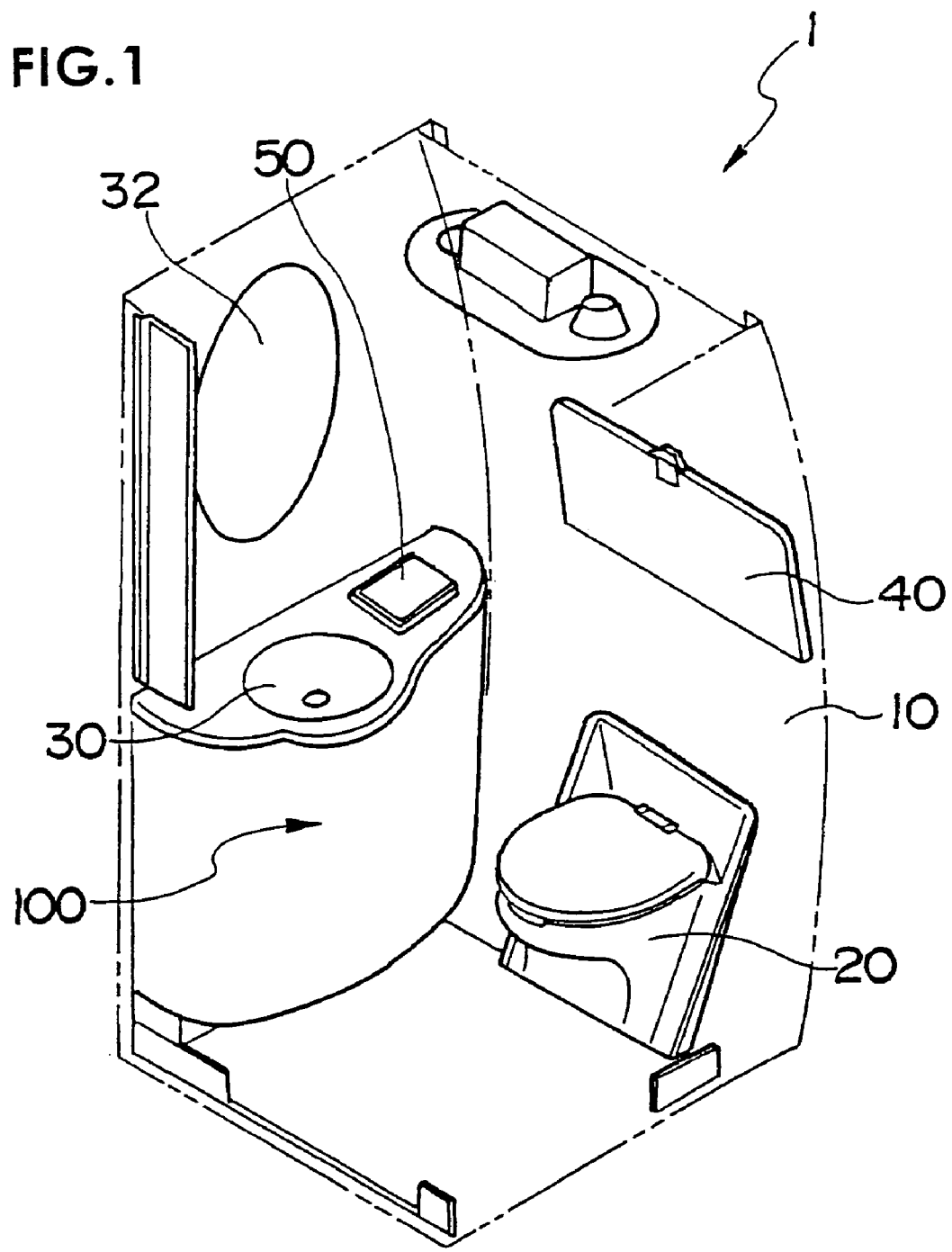
FIG. 1 is an explanatory view showing the outline of a lavatory unit of an aircraft to which the present invention is applied.

FIG. 1 is an explanatory view showing a general outline of a lavatory unit of an aircraft in which the present invention is applied.

A lavatory unit, the whole of which being denoted by reference number 1, is structured using panel members 10, and shaped so as to correspond to the place of installation in the aircraft.

A toilet bowl 20, a wash basin 30, a mirror 32, an auxiliary folding bed 40 and so on are equipped inside the lavatory unit 1.

A trash slot lid 50 is disposed next to the wash basin 30, through which trashes such as tissue papers are thrown in. The trash slot lid 50 is a hinged door that opens downward, and below the lid 50 is disposed a trash bin 100.

Figure 2:
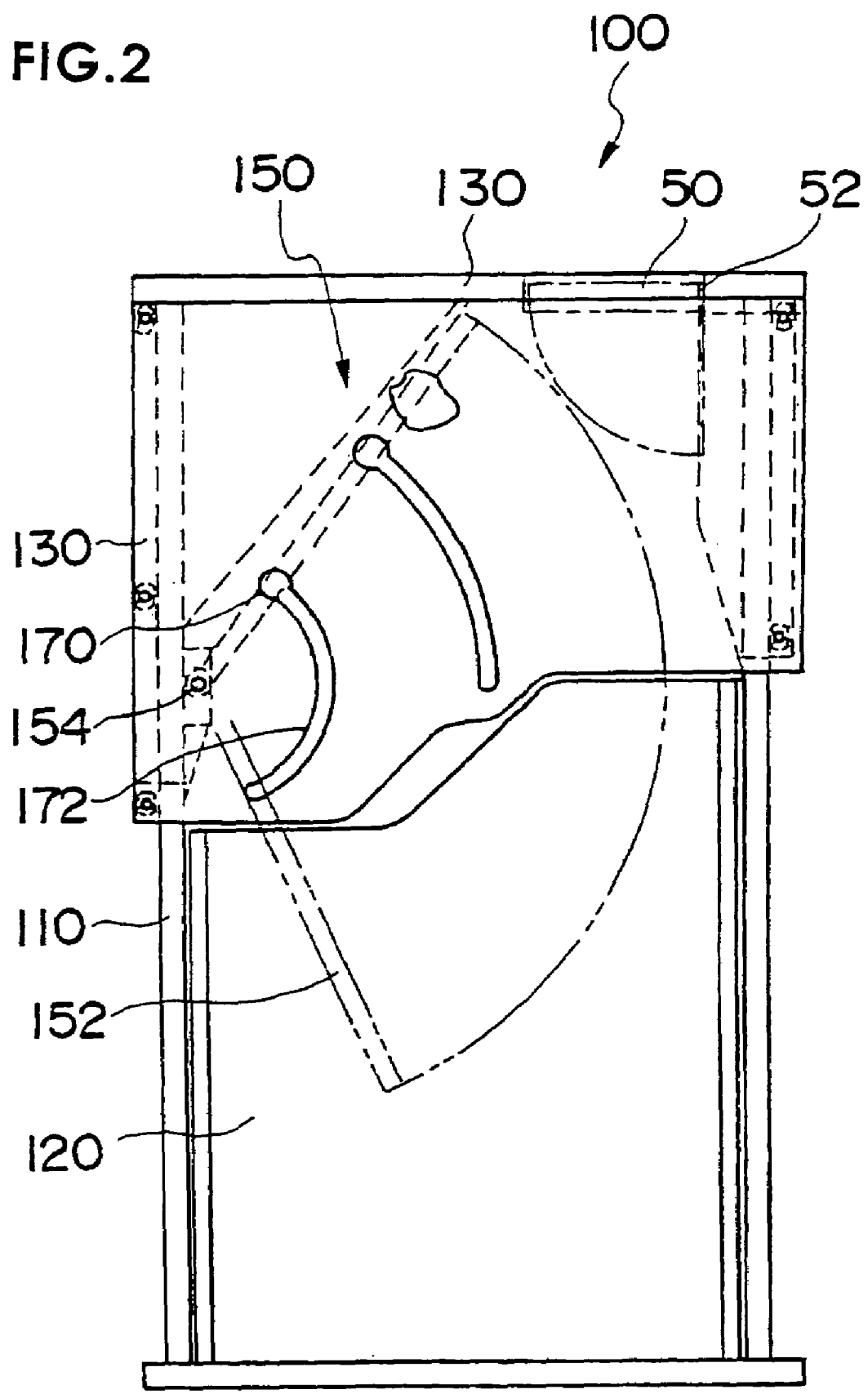
FIG. 2 is a front view of a trash bin for a lavatory unit of an aircraft according to the present invention.
Figure 3:
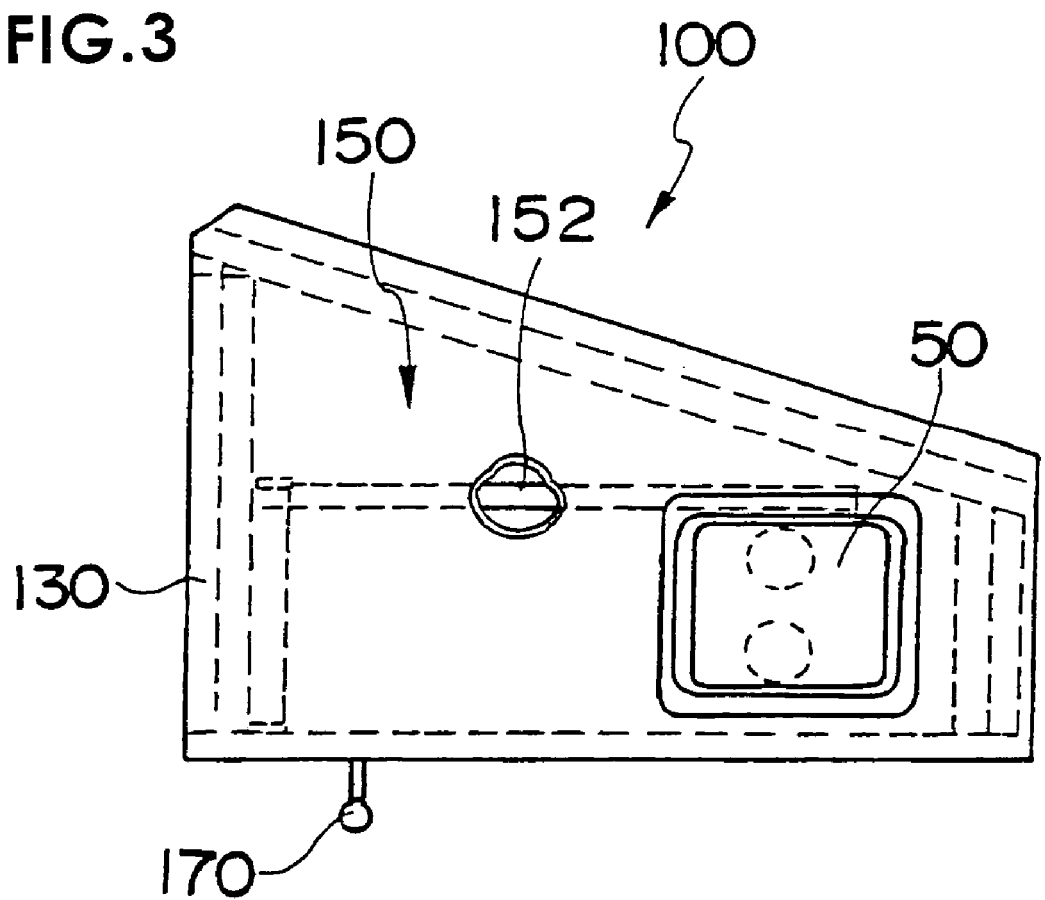
FIG. 3 is a plan view of the trash bin for a lavatory unit of an aircraft according to the present invention.

FIG. 2 is a front view showing the overall structure of the trash bin equipped with a trash compactor according to the present invention, and FIG. 3 is an upper view thereof.

A trash bin, the whole of which being denoted by reference number 100, has a trash slot lid 50 disposed on an upper surface of a frame 130. The trash slot lid 50 can be pivoted in the downward direction via a hinge 52, and is constantly biased toward the closing direction by a spring or the like not shown.

A container 120 is disposed within a housing 110 connected to the frame 130, for receiving trashes such as tissue papers thrown in through the trash slot lid.

The trash compactor, the whole of which being denoted by reference number 150, is equipped with a trash compressing member 152 attached pivotably to the frame 130 via a shaft 154. The trash compressing member 152 is operated manually using a handle 170.

The line of action of the pivoting movement of the trash compressing member 152 of the trash compactor 150 starts at a standby position in which the end of the member contacts a ceiling of the frame 130 and ends at a lowered position in which the trash is compressed to a maximum. The lid 50 on the trash slot is a hinged door, but the trash compressing member 152 is positioned so that the lines of pivoting action of the two members do not interfere with each other.

Moreover, a guide groove 172 of the handle 170 can be disposed on the side of the frame 130.

Figure 4:
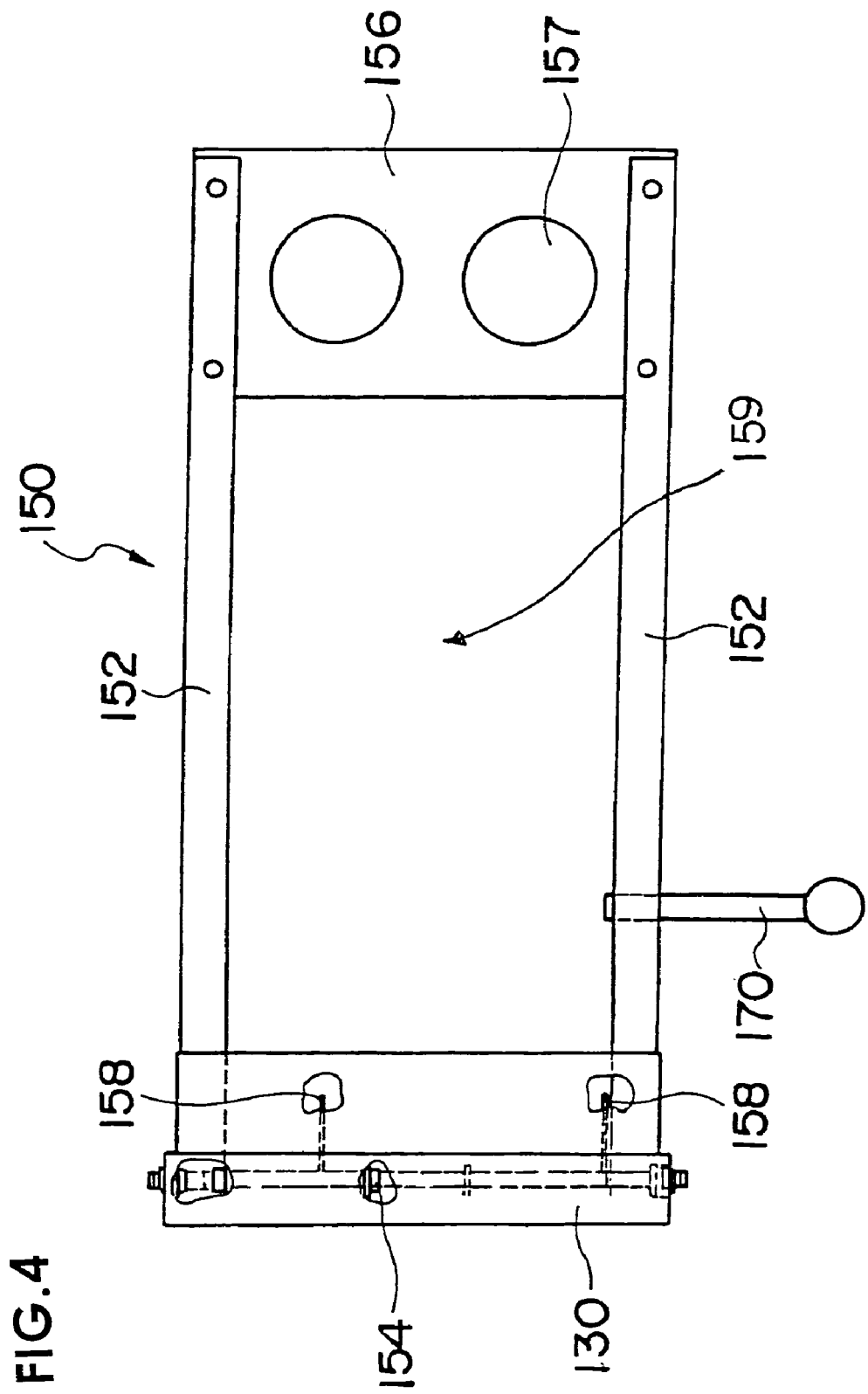
FIG. 4 is a plan view of a trash compactor according to the present invention.
Figure 5:
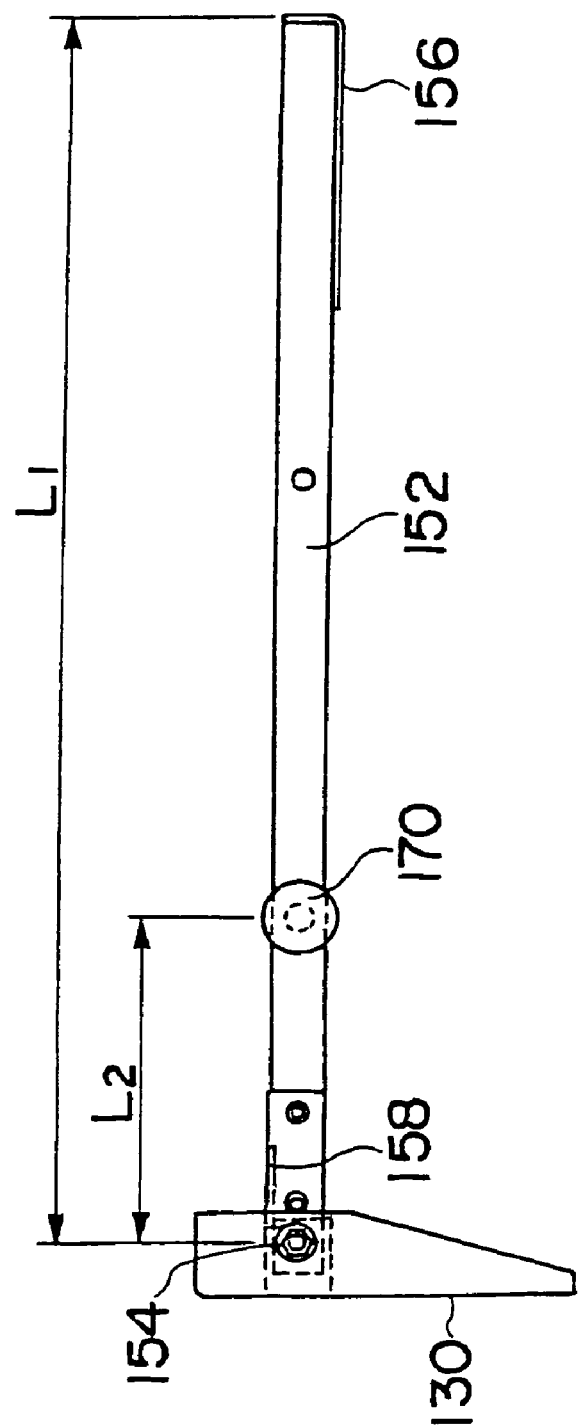
FIG. 5 is a front view of the trash compactor according to the present invention.

FIG. 4 is a plan view of the trash compactor 150, and FIG. 5 is a front view thereof.

The trash compressing member 152 has a plate member 156 that connects the ends of a pair of arms disposed in parallel. Punch holes 157 are formed if necessary to the plate member 156.

The portion of the trash compressing member 152 connected to the frame 130 is pivotably attached to the frame 130 via a shaft 154.

A handle 170 is attached to the trash compressing member 152, for manually pushing down the trash compressing member and compressing the trash inside the container. Springs 158 disposed around a shaft 154 functions to return the trash compressing member 152 to its standby position.

Moreover, a space 159 is provided so as to let the trash fall into the container when the trash compactor 150 is returned to its standby position after compressing the trash, thereby preventing the trash being flipped up from interfering with the pivoting action of the trash compactor.

As disclosed, the trash compactor according to the present invention enables to compress and reduce the quantity of the trash manually by a simple operation, in the lavatory unit of an aircraft, which is a facility that has strict space limitation demands.

According to the present invention, the frequency of collecting the trash during flight can be reduced, saving time and work of the crew on board.

What is claimed is:

1. A trash compactor used for a lavatory unit of an aircraft, the trash compactor comprising:
   a housing disposed inside a lavatory of an aircraft, the housing having an upper frame, a lower frame, and sideframes;
   a container is disposed inside the housing for storing trash thrown therein through a pivotable lid attached to a trash slot located on the upper frame, the container disposed inside the lavatory unit of the aircraft, the pivotable lid is disposed on an upper surface of the upper frame and opens downwardly toward an inside area of the housing;
   a trash compressing member having a pair of arms that are pivotably supported via a shaft on the sideframes of the housing in which the container is housed;
   a spring for biasing the trash compressing member toward a standby position;
   a plate member attached to an end of the trash compressing member and connected to the pair of arms, the plate member comprising a plurality of punch holes; and
   a manipulating handle attached to one of said arms for manually pushing down the trash compressing member and compressing the trash inside the container,
   wherein the trash compressing member is positioned so that a line of pivoting action thereof does not interfere with a line of pivoting action of the lid on the trash slot.

* * * * *